United States Patent [19]

Ritzinger

[11] Patent Number: 4,705,975
[45] Date of Patent: Nov. 10, 1987

[54] SYNCHRO-GENERATOR

[75] Inventor: Georg Ritzinger, Klosterneuburg, Austria

[73] Assignee: Voest-Alpine Automotive Gesselschaft, Linz, Austria

[21] Appl. No.: 890,311

[22] Filed: Jul. 25, 1986

[30] Foreign Application Priority Data

Jul. 30, 1985 [DE] Fed. Rep. of Germany ....... 3527226

[51] Int. Cl.$^4$ ............................................ H02K 19/00
[52] U.S. Cl. .................................... 310/162; 310/111; 310/184
[58] Field of Search ...................... 310/49 R, 113, 162, 310/198, 163, 216, 164, 171, 165, 254, 184, 261, 195, 199, 111, 51; 336/10, 79; 318/712, 713, 724; 340/870.34

[56] References Cited

U.S. PATENT DOCUMENTS

| 712,041 | 10/1902 | Buck | 310/163 |
|---|---|---|---|
| 1,289,898 | 12/1918 | Phillips | 310/49 R |
| 2,074,353 | 3/1955 | Alkan | 336/79 |
| 2,388,977 | 11/1945 | Johnson | 340/870.34 |
| 2,434,259 | 1/1948 | Burton | 340/870.34 |
| 2,590,845 | 4/1952 | Curry, Jr. | 310/111 UX |

FOREIGN PATENT DOCUMENTS

| 2261236 | 12/1972 | Fed. Rep. of Germany . |
| 2931724 | 8/1979 | Fed. Rep. of Germany . |
| 3432395 | 9/1984 | Fed. Rep. of Germany . |

OTHER PUBLICATIONS

Brochure entitled "Resolvers" by Moore Reed & Co. Ltd., Hampshire, England, printed by Premier Graphics (0793) 39722, 11/79.

Article entitled "Mate Synchros with Computers by Using Solid-State Conversion Modules, s/D and D/s Converters can Minimize Mechanical Interfacing While Boosting Reliability" by Richard Ferrero, pp. 72-76, Electronic Design, vol. 19, dated Sep. 13, 1975.

Primary Examiner—R. Skudy
Attorney, Agent, or Firm—Thomas R. Vigil

[57] ABSTRACT

The present synchro-generator comprises a stator, which comprises at least two signal windings, which are offset predetermined angles relative to each other, and a rotor, which carries an exciter winding (3).

In order to provide a structure which is simple and inexpensive and to generate output voltages which approximate sine voltages as closely as possible, the stator comprises an axially aligned cylindrical coil (9), which is known per se and provided with obliquely wound windings, the rotor comprises a rod core (2) carrying the exciter winding (3), the two ends of the rod core (2) face and define an air gap with the inside surface of the cylindrical coil (9), and the latter is surrounded on its outside surface by a shell (11) of low-reluctance material.

3 Claims, 4 Drawing Figures

SYNCHRO-GENERATOR

This invention relates to a synchro generator a stator, which comprises at least two signal windings which are offset predetermined angles relative to each other, and a rotor, which carries an exciter winding.

A known synchro generator of that kind is also called a resolver (company prospectus "Resolver", Moore Reed, November 1979). In that known synchro generator the rotor and stator consist of laminated cores and the windings extend in grooves of the core, i.e., the structure is like that of conventional electric motors. The rotor shaft carries the annular secondary winding of the input coupling transformer, and said secondary winding is surrounded on the outside by the also annular, stationary primary winding, with an intervening air gap.

During operation the rotor winding is fed via the input coupling transformer with an audiofrequency signal and two output signals are induced in two stator windings. which are offset 90° from each other. The instantaneous angular position of the rotor shaft can definitely be derived from said output signals. Such circuits are known in the art and have been described, e.g., in Electronic Design 19, Sept. 13, on pages 72 et seq. (1975).

The known synchro comprises a highly expensive mechanical structure and high costs are particularly due to the manufacture of the rotor windings and stator windings and of the associated laminated cores.

In Published German Application No. 34 32 395 it has been proposed to use an annular core for the stator so that the stator structure can be greatly simplified. But the provision of a winding on an annular core is expensive so that relatively high costs are still involved.

The last remark is applicable also to the synchro generator which is known from U.S. Pat. No. 2,704,353 and comprises two coils extending one in the other, namely, a toroidal outer coil and a straightly wound cylinder coil, which is provided with an a.c.-fed exciter winding. A disc which is mounted, e.g., on the axis of a magnetic compass and is inclined relative to its axis of rotation effects a suitable deflection of the field so that a three-phase signal is generated in three windings of the toroidal coil. From that three-phase signal the angle through which the disc has been rotated can definitely be derived. The toroidal winding involves high costs and the local coupling provided between the inner and outer coils owing to the soft iron disc is only very weak so that a relatively high exciting power is required for a generation of sufficiently large output signals.

Additional prior art is disclosed in U.S. Pat. No. 2,590,845, which also describes a synchro of the kind described first hereinbefore. The rotor and stator comprise a large number of poles each as well as windings having a complicated configuration, like those of electric motors. Partial windings can be interconnected for a generation of more complex output signals, which permit of a higher resolution. The high structural expenditure results in high costs and the evaluation of the output signals is difficult.

It is an object of the invention to provide a synchro which is structurally simple and inexpensive and which can particularly be associated with step motors for an indication of the number of steps which have been performed. For this reason the resolution should correspond to at least one step, i.e., to at least 1.8° in case of a step motor performing, e.g., 200 steps per revolution. The voltages applied to the signal windings should constitute, if possible, a sine function of the angular movement of the rotor so that the circuit expenditure required to evaluate the signal will remain low.

SUMMARY OF THE INVENTION

That object can be accomplished with a synchro generator which is of the kind described first hereinbefore and in which, in accordance with the invention, the stator comprises an axially aligned cylindrical coil, which is known per se and provided with oblique by wound windings, the rotor comprises a rod core carrying the exciter winding, the two ends of the rod core face and define an air gap with the inside surface of the cylindrical coil, and the cylindrical coil is surrounded on its outside surface by a shell of low-reluctance material.

In the synchro designed in accordance with the invention it is possible to use commercial coils having oblique by wound windings. Such coils have been disclosed for use in d.c. machines. e.g., in Published German Application No. 22 61 236 or Published German Application No. 29 31 724. Such coils can be fully automatically made on winding machines with high accuracy and at low cost. The shell of low-reluctance material which surrounds the outside surface of the cylindrical coil effects a concentration of the field lines adjacent to the ends of the rod core so that the signal-to-noise ratio is high. This is also due to the fact that the synchro generator is shielded against extraneous fields; this is of special importance in motor vehicles.

The use of an electrically conductive shell affords the additional advantage that axial alternating fields which may be established, e.g. by a step motor that is connected to the synchro generator, will greatly be attenuated.

Preferably the cylindrical coil is bobbin less and self-supporting, the space requirement is reduced and the signal-to-noise ratio can be further increased.

In accordance with a further feature of the invention the cylindrical coil comprises two wound layers, each of which comprises individual windings, and the two individual windings of each pair of superimposed individual windings are connected in series to constitute a signal winding. That arrangement will also improve the signal-to-noise ratio.

The invention and further advantages and features thereof will now be explained more in detail with reference to an illustrative embodiment and is shown on the drawing.

DESCRIPTION OF THE PREFERRED EMBODIMENT

Figure 1:
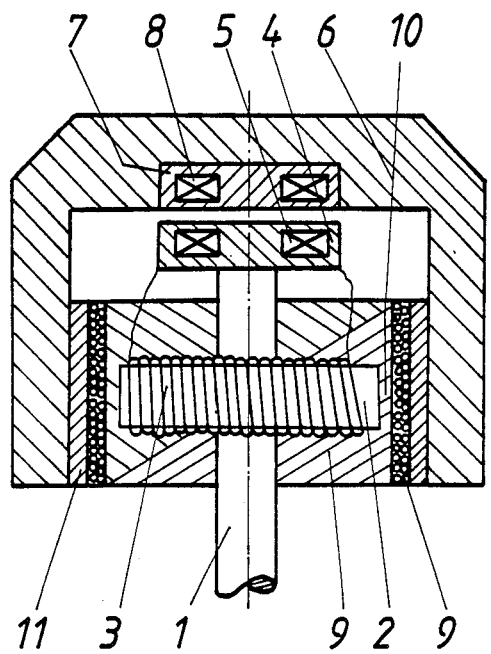
FIG. 1 is a vertical section view through a synchro-generator constructed in accordance with the teachings of the present invention.

In accordance with FIG. 1 a rod core 2 has two longitudinal ends and is non-rotatably connected to a shaft 1, which is connected, e.g., to the shaft of a step motor, not shown. That rod core 2 is provided with a cylindrical exciter winding 3. One half 4 of a conventional shell core made of ferrite or the like is secured to that end of the shaft 1 which is at the top in the drawing. The shell core is axially symmetrical with respect to the shaft 1. The chamber defined by the half 4 of the shell core accommodates a winding 5, which is connected to the exciter winding 3. The housing 6 of the synchro carries the second half 7 of the shell core, which defines a chamber that accommodates a winding 8. The halves 4, 7 of the shell core are disposed opposite to each other and define an air gap between them.

The rod core 2 may rotate inside a cylindrical coil 9, the inside surface of which defines an air gap 10 with the ends of the rod core. The outside surface of the cylindrical coil 9 is surrounded by a shell 11 made of low-reluctance material and circumferentially surrounds the cylindrical coil 9 for greater part of the axial extension of the cylindrical coil. That shell 11 may consist, e.g., by a Mu-metal strip would around the cylindrical coil 9. Alternatively the shell 11 may be made of ferrite, transformer plate or the like.

Figure 3:
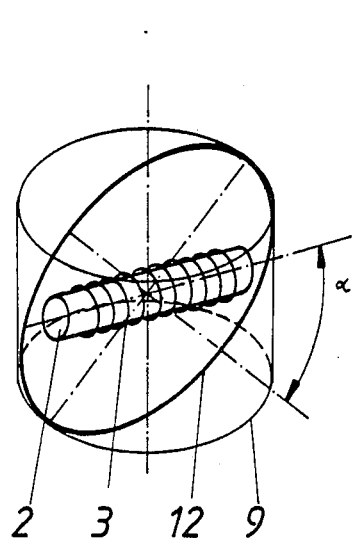
FIG. 3 is a perspective view of the synchro-generator shown in FIG. 1 and shows the position of a rod core inside a cylindrical coil.
Figure 4:
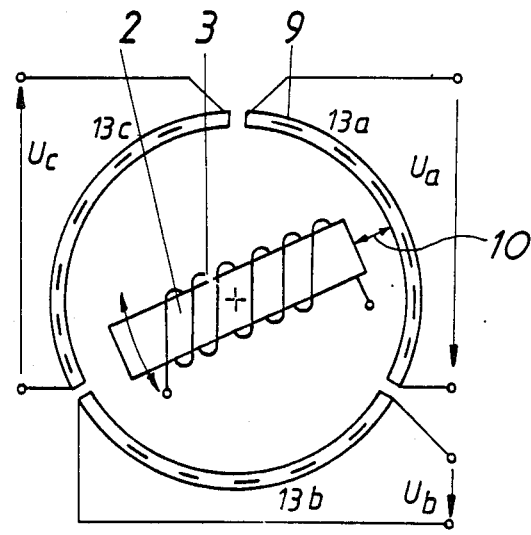
FIG. 4 is a diagrammatic top plan view of the synchro-generator shown in FIG. 1 and shows the arrangement of the rod core having an exciter winding thereof and shows the position of the exciter winding relative to three signal windings which are offset 120° from each other.

The cylindrical coil 9 comprises oblique wound signal windings in a manner known per se. Only one turn 12 of the winding is shown in FIG. 3; the remaining turns adjoin that one turn. If three signal windings are provided, there will be three windings displaced 120° from each other in a cross-sectional view of the cylindrical coil. Three such signal windings 13a, 13b, 13c are diagrammatically represented. It must be borne in mind that the windings are obliquely wound so that each turn of each signal winding extends around 360° C. in a top plan view taken in the direction of the axis of the coil.

Figure 2:
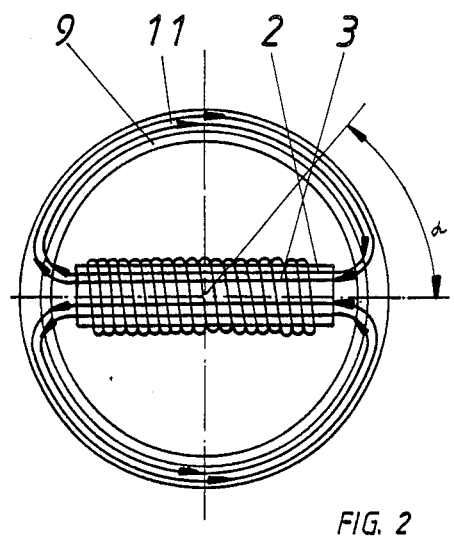
FIG. 2 is a diagrammatic top plan view of the synchro-generator shown in FIG. 1 and illustrates the configuration of the magnetic field lines in the synchro-generator.

As is apparent from FIG. 2 the magnetic circuit is completed by the shell 11, which effects a concentration of the field lines and a shielding against extraneous fields.

The windings 5 and 8 of the shell core halves 4 and 7 constitute the secondary and primary windings of a rotatable transformer for a contactless feeding of an a.c. voltage, e.g., at a frequency of 10 kHz. It will be understood that the exciter winding 3 might also be fed via slip rings (not shown in the drawing).

The output signals $u_a$, $u_b$, $u_c$ induced in the three signal windings 13a, b, c by the alternating fields established by the exciter winding 3 can be defined as follows.

$$u_a = u_0\cos(\omega t + \phi) \sum_{n=1}^{k} \sin\left(\alpha + \frac{2\pi}{3} \cdot \frac{n-1}{k}\right)$$

$$u_b = u_0\cos(\omega t + \phi) \sum_{n=1}^{k} \sin\left(\alpha + \frac{2\pi}{3} \cdot \frac{n-1}{k} + \frac{2\pi}{3}\right)$$

$$u_c = u_0\cos(\omega t + \phi) \sum_{n=1}^{k} \sin\left(\alpha + \frac{2\pi}{3} \cdot \frac{n-1}{k} + \frac{4\pi}{3}\right)$$

wherein
$u_0$: maximum value of the induced signal
$\alpha$: angular movement of rod core
$\phi$: phase displacement between rotor and stator (FIGS. 2, 3)
$\omega$: angular frequency of feed voltage
k: number of windings per signal winding
n: summation index It is apparent that the angle $\alpha$ can be calculated from two of the three signal voltages $u_a$, $u_b$, $u_c$. It will be desirable, however, to have all three signal voltages available, for instance, because the division by value close to zero can be avoided in that case.

The angle can be calculated by analog or digital methods in known circuits and is no subject matter of the present invention.

In any case it will be sufficient to provide only two signal windings, which will be offset 90° from each other in that case.

The signal-to-noise ratio can be improved by the provision of a cylindrical coil which has two obliquely wound layers. Each of said layers may comprise, e.g., three individual windings and the individual windings may constitute pairs of superimposed individual windings which are connected in series to form a signal winding.

For a suppression of axial alternating fields which may be established, e.g., by the step motor mounted on the shaft 1, the low-reluctance shell 11 may be made of a material having high to moderate value of electrical conductivity. Because the air gap 10 between the ends of the rod core 2 and the inside surface of the cylindrical coil 9 should be small, it may be preferable to provide the cylindrical coil 9 on its inside surface with a hard protective layer (not shown) so that damage will be avoided if the ends of the rod core should wipe on the coil 9.

Because obliquely wound coils can be made with high accuracy, the position-dependent function of the signal voltage will actually consist of a sine function so that the position angle $\alpha$ can be calculated by means of simple algorithms without special correction. Besides, the obliquely wound cylindrical coil can be fully automatically made at low cost with high linearity and reproducibility. The term "rod core" used here includes also a design in which a rotor which is provided with pole shoes at its ends, as is known from electric machines.

What is claimed is:

1. A synchro-generator comprising a stator including at least two signal windings, each signal winding being offset a predetermined angle relative to each other signal winding, and a rotor, which carries an exciter winding, characterized in that:
said stator comprises an axially aligned cylindrical coil provided with obliquely wound signal windings,
said rotor further comprises a rod core having two longitudinal ends carrying said exciter winding, each longitudinal end of the rod core faceing and defining an air gap with the inside surface of said cylindrical coil, and
a shell of low-reluctance metal circumferentially surrounds said cylindrical coil for the greater part of the axial extension of said cylindrical coil.

2. A synchro-generator according to claim 1, characterized in that the shell has a high to moderate value of electrical conductivity.

3. A synchro-generator according to claim 1, characterized in that the cylindrical coil comprises two wound layers, each said layer including three individual windings for each signal winding.

* * * * *